(12) United States Patent
Doyle et al.

(10) Patent No.: US 7,348,986 B2
(45) Date of Patent: *Mar. 25, 2008

(54) IMAGE RENDERING

(75) Inventors: Peter L. Doyle, El Dorado Hills, CA (US); Aditya Sreenivas, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 337 days.

This patent is subject to a terminal disclaimer.

(21) Appl. No.: 11/045,018

(22) Filed: Jan. 26, 2005

(65) Prior Publication Data

US 2005/0212805 A1    Sep. 29, 2005

(51) Int. Cl.
*G06F 15/16* (2006.01)
*G06F 15/80* (2006.01)

(52) U.S. Cl. ............ 345/502; 345/503; 345/504; 345/505

(58) Field of Classification Search ........ 345/502–505, 345/541, 553
See application file for complete search history.

(56) References Cited

U.S. PATENT DOCUMENTS

| | | | |
|---|---|---|---|
| 5,388,206 A * | 2/1995 | Poulton et al. | ............ 345/505 |
| 5,757,385 A | 5/1998 | Narayanaswami et al. | |
| 5,940,086 A | 8/1999 | Rentschler et al. | |
| 5,969,726 A | 10/1999 | Rentschler et al. | |
| 6,124,868 A | 9/2000 | Asaro et al. | |
| 6,184,903 B1 | 2/2001 | Omori | |
| 6,215,497 B1 | 4/2001 | Leung | |
| 6,339,427 B1 | 1/2002 | Laksono | |

* cited by examiner

*Primary Examiner*—Kee M. Tung
*Assistant Examiner*—Hau H Nguyen
(74) *Attorney, Agent, or Firm*—Fish & Richardson P.C.

(57) ABSTRACT

An image is rendered by dividing the image into chunks, rendering the chunks in one of at least two devices, and determining which of the devices renders each one of at least some of the chunks based on at least one device's progress in the rendering of other chunks.

22 Claims, 5 Drawing Sheets

IMAGE RENDERING

BACKGROUND

This invention relates to image rendering.

One way to accelerate the speed by which a three-dimensional image can be rendered from stored image data is to divide the image into subportions and distribute the subportions to different devices for rendering in parallel. One scheme, called scan line interleaving (SLI), generates the image line by line, with every other line rendered by one device and the intervening lines rendered by a second device. A different scheme divides the image in half and renders the two halves with different devices. A third scheme divides the image into identically-sized rectangular chunks and assigns the chunks to different devices for rendering.

SUMMARY

In general, in one aspect, the invention features rendering an image by dividing the image into chunks, rendering the chunks in one of at least two devices, and determining which one of the at least two devices renders each one of at least some of the chunks based on the progress of at least one device of the at least two devices in the rendering of other chunks.

In another aspect, the invention features rendering an image by dividing the image into chunks, creating a command buffer for each of the chunks (each command buffer containing instructions necessary to render the chunk), placing each command buffer in a ring buffer, and processing each of the command buffers with one of at least two devices. One device processes at least one of the command buffers starting at a head of the ring buffer and the other device processes at least one of the command buffers starting at a tail of the ring buffer.

In another aspect, the invention features a computer system including a processor configured to divide an image into chunks and render at least some of the chunks, a system bus to carry the chunks to memory, and a graphics device configured to render at least some of the chunks, the chunks being determined by the progress of the processor in rendering chunks.

Other advantages and features will become apparent from the following description and from the claims.

DESCRIPTION

Figure 1:
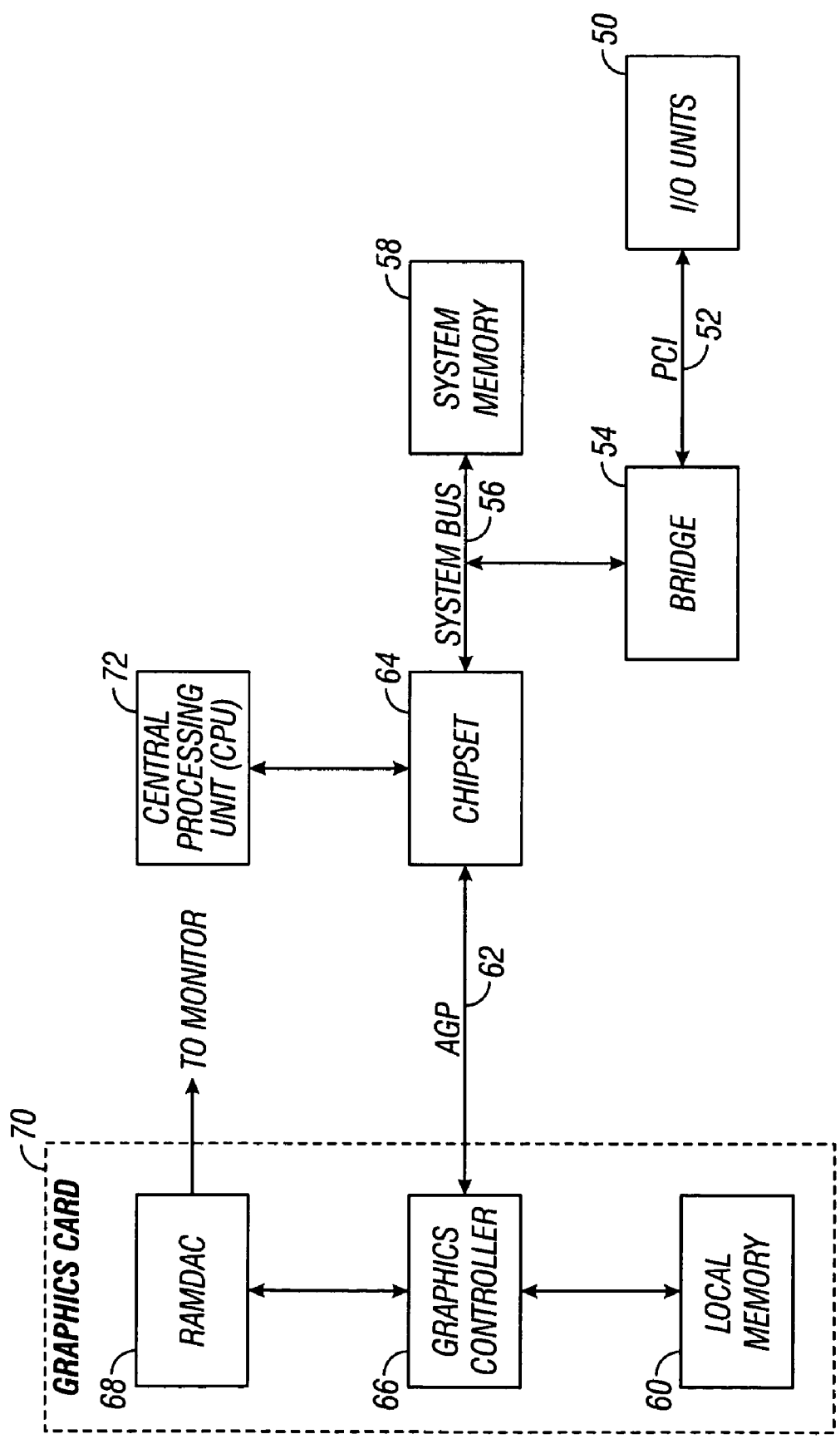
FIG. 1 is a block diagram of a computer.
Figure 2:
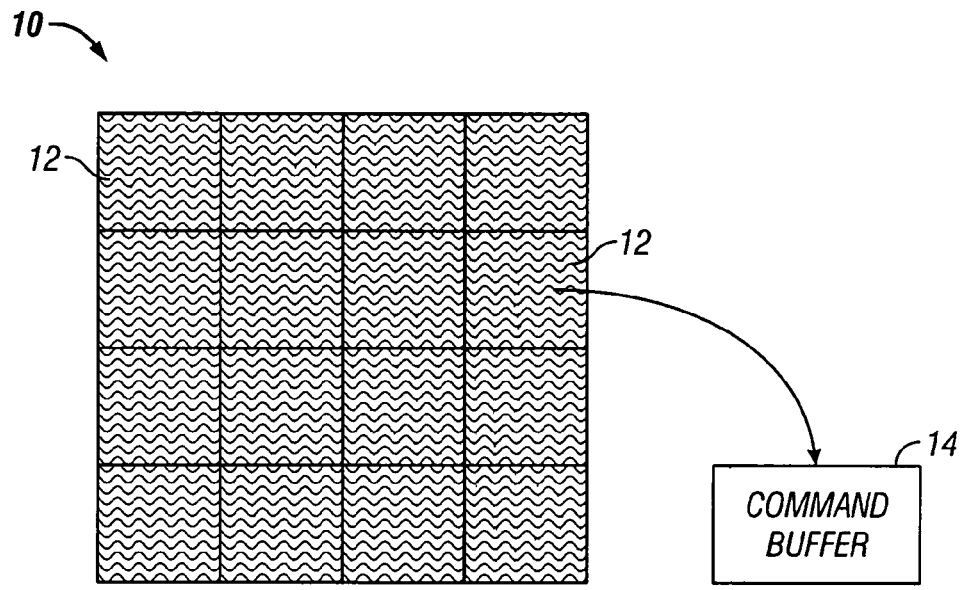
FIG. 2 is a diagram of an image.

In a specific example of the invention shown in FIGS. 1 and 2, an image 10 to be rendered is stored in an I/O unit 50, e.g., a disk drive. A peripheral component interconnect (PCI) bus 52 carries the image 10 from the I/O unit 50 through a bridge 54 and a system bus 56 to a system memory 58. A chipset 64 controls a graphics controller 66 in a graphics card 70 (a graphics device). The chipset 64 allows the graphics controller 66 to fetch the image 10 from system memory 58 via the system bus 56 and an accelerated graphics port (AGP) 62.

Two devices (e.g., central processing unit (CPU) 72 and graphics card 70) render the image 10 from the stored image data. After the image 10 is fully rendered, a RAMDAC (random access memory digital-analog converter) 68 converts the digital image to an analog image and sends it for display on the computer's monitor.

Once the graphics controller 66 fetches the image 10, driver software in the graphics controller 66 divides the image 10 into chunks 12, e.g., identically-sized rectangles, to facilitate rendering. The software in the graphics controller 66 then creates a command buffer 14 for each chunk 12 in system memory 58. Each command buffer 14 contains all of the commands required to render one chunk 12.

Figure 3:
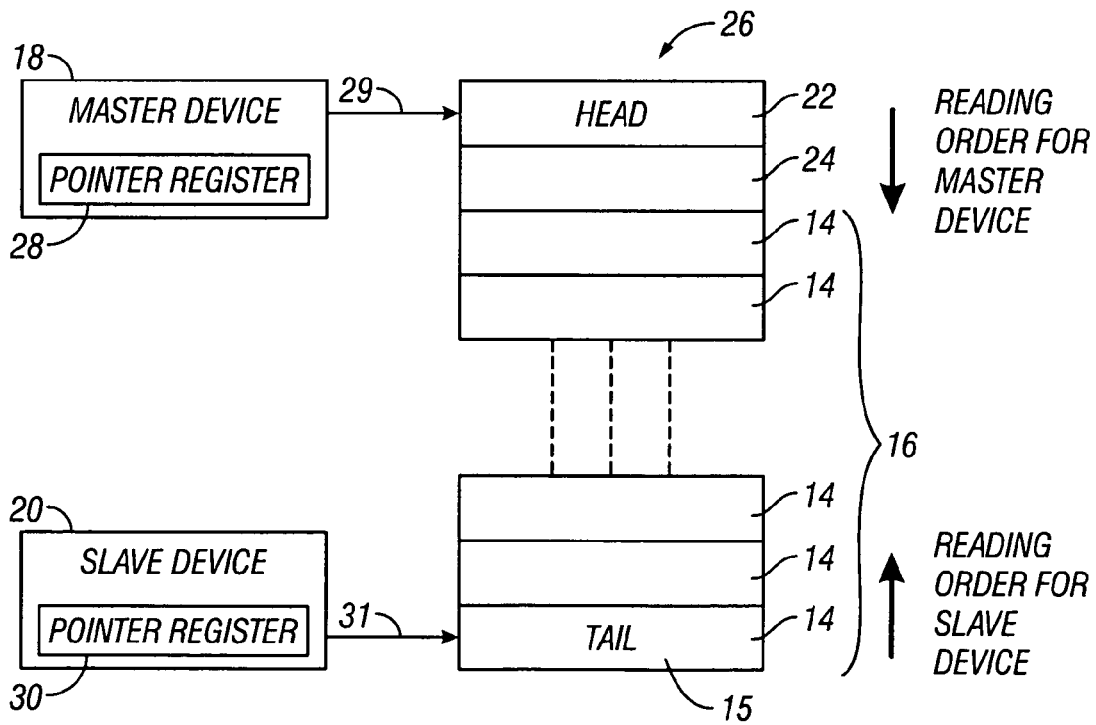
FIG. 3 is a diagram illustrating an image rendering process.
Figure 4A:
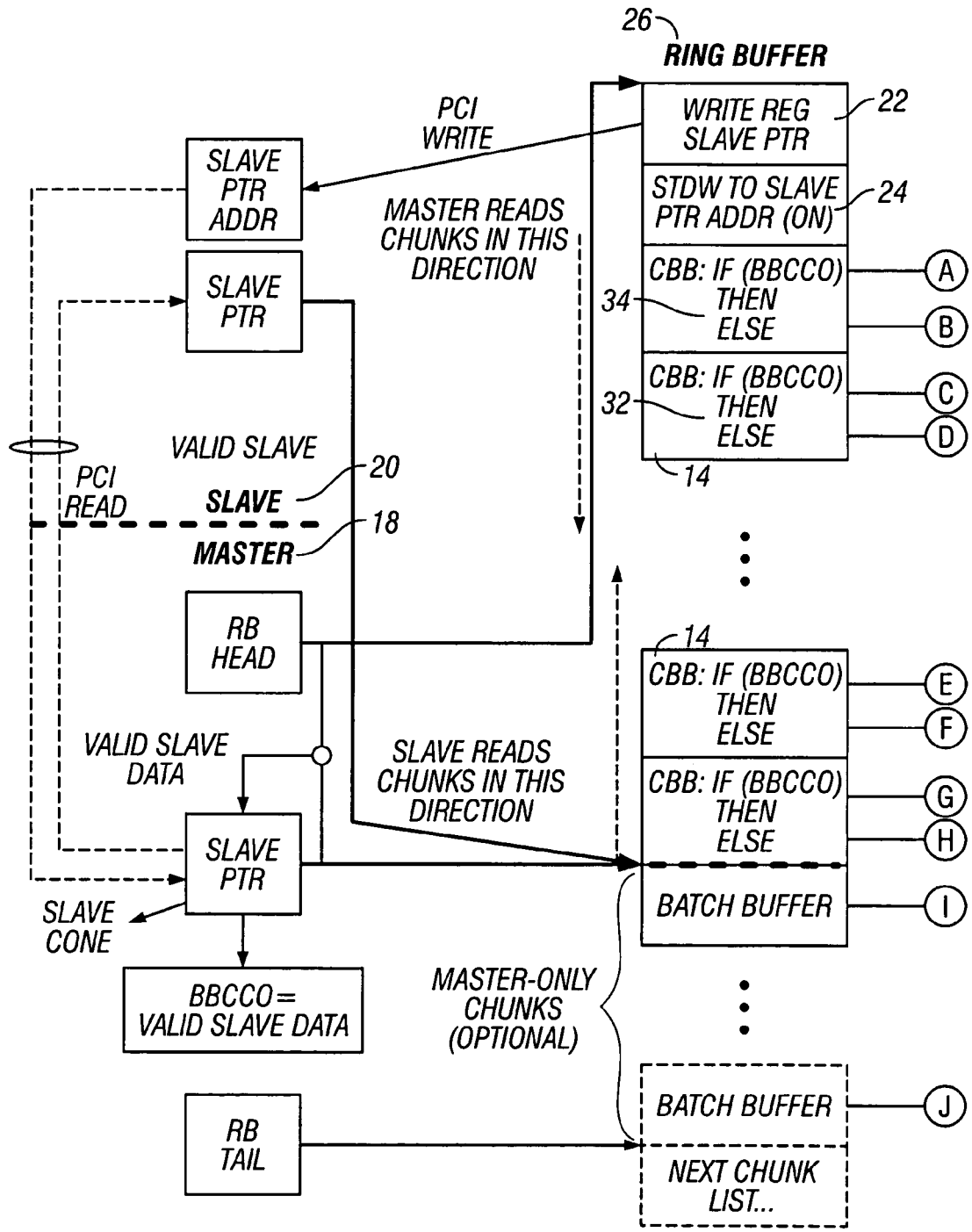
FIG. 4 is a diagram illustrating an image rendering process.
Figure 4B:
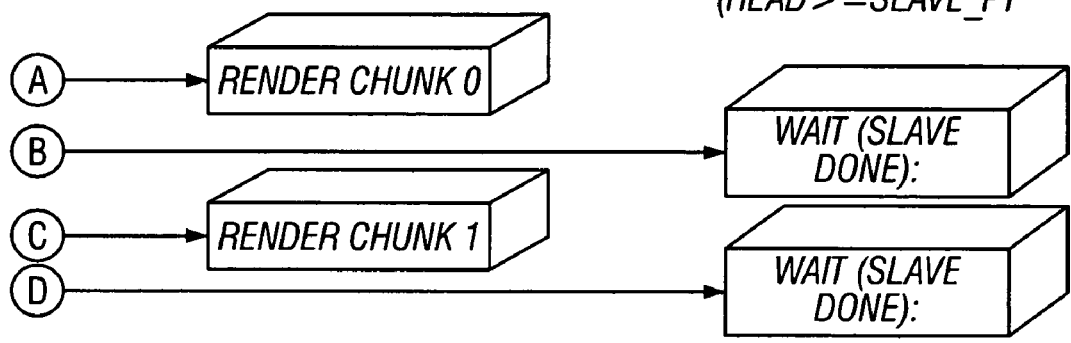
Figure 4B:
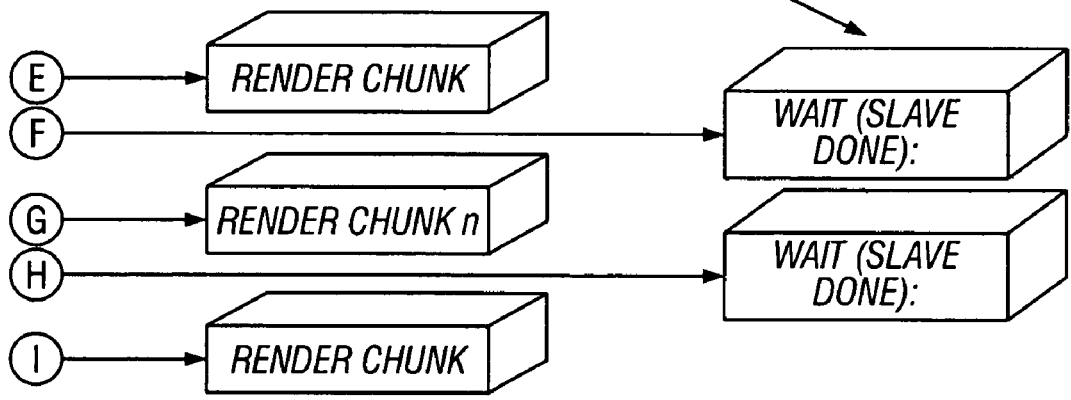
Figure 4B:

As seen in FIG. 3, the software in the graphics controller 66 organizes all command buffers 14 into an ordered list 16. An optimization algorithm built into the software in the graphics controller 66 may create the ordered list 16. One possible optimization algorithm compares the estimated time needed to render the chunks 12 stored in each command buffer 14 to the relative performance capabilities of devices 18 and 20, the devices which will do the rendering, described further below. For example, the more detailed a chunk 12 is (e.g., ten colors v. two colors; middle of image 10 v. edge of image 10), the longer it takes to render. The optimization algorithm could place the more complex chunks 12 at a point in the ordered list 16 where the quicker device 18 or 20 will more likely first access it. The probability of first access is assessed given that the devices 18 and 20 may vary in speed and that device 18 starts rendering chunks 12 at the top of the ordered list 16 with a head command buffer 14a while device 20 starts at the bottom with a tail command buffer 14n. Ordering the least complex chunks 12 in the middle of the ordered list 16 tends to maximize the time device 18 and 20 render in parallel.

At the top of the ordered list 16, the software places two additional command buffers 22 and 24 to form a ring buffer 26 that is stored in system memory 58. The command buffers 22 and 24 contain the commands (described further below) necessary for the master device 18 to inform the slave device 20 of the address of the tail command buffer 14n in the ordered list 16 of command buffers 14.

The ring buffer 26 is a temporary storage area for a series of elements (here, command buffers 14), placed in a list having a head (first or top) and a tail (last or bottom). Two devices process elements in the list, one working from the head down and the other from the tail up. Here, the master 18 starts processing the ring buffer 26 at the head (command buffer 22) and the slave 20 starts at the tail (tail command buffer 14n). Pointers associated with each device direct the devices from element to element. Once both pointers point to the same element, the list is empty and processing of the list ceases. So here, master 18 and slave 20 process the ring buffer 26 simultaneously until their pointers 29 and 31 both point to the same command buffer 14.

The software identifies the master device 18 and the slave device 20. Ideally, one device is a discrete device, preferably the master 18, while the other device is an integrated device, preferably the slave 20. A discrete device is a separate and distinct device, e.g., CPU, whereas an integrated device is a collection of distinct elements, e.g., graphics card. In this example, the integrated device (slave 20) attaches to the discrete device (master 18). Often an integrated slave device is slower than a discrete master device.

After identifying the master 18 and slave 20, the software loads the address of the first command buffer 22 (the head of ring buffer 26) to a master pointer register 28. The master 18 reads this address to get pointer 29. The master 18 processes command buffers starting at this point, in this case, command buffer 22. The master 18 continues processing command buffers in the ring buffer 26 one by one as its pointer 29 moves down from the head of ring buffer 26.

Also referring to FIG. 4, master 18 first processes command buffer 22, enabling it to inform the slave 20 where to start processing command buffers 14. The master 18 loads the address of the tail command buffer 14n in the ring buffer 26 to a slave pointer register 30. The slave 20 reads this address to get pointer 31. The slave 20 starts its processing at the tail command buffer 14n and works its way up the ring buffer 26, directed by pointer 31.

Now with the master 18 pointing to the head command buffer 14a in the ordered list 16 and the slave 20 pointing to the tail command buffer 14n, they can process command buffers 14 in parallel. A hardware mechanism in the graphics controller 66, implemented in both devices 18 and 20, distributes the command buffers 14 between the devices 18 and 20 in a synchronized and load balanced fashion.

The devices 18 and 20 each process the command buffers 14 in parallel at their own synchronous rates, in their respective directions. Rendering with a discrete device and an integrated device accommodates a performance level difference between the two devices. The more powerful device, probably the discrete device, works at its performance level while obtaining whatever performance boost the other device provides.

Figure 5:
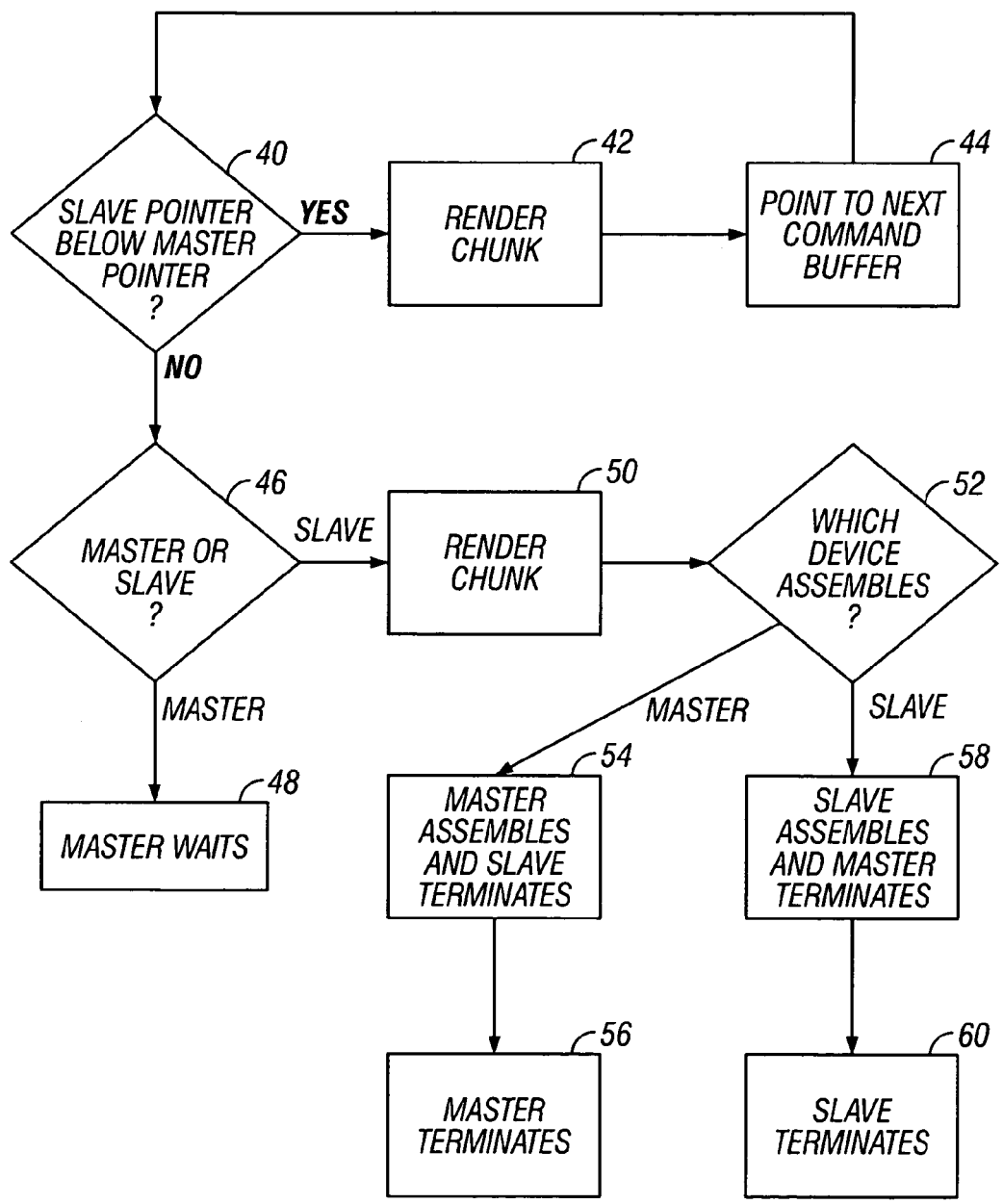
FIG. 5 is a flowchart of an image rendering process.

Also referring to the flowchart of FIG. 5, each time device 18 or 20 points to the next command buffer 14, instructions 32 in a conditional batch buffer (CBB) 34 determine which device 18 or 20 renders the chunk 12. When master pointer 29 or slave pointer 31 first points to a command buffer 14, an instruction 40 asks whether the slave pointer 31 points to a command buffer 14 below the master pointer 29. If so, that means two or more command buffers 14 remain in the ring buffer 26. Then, in an action 42, the device 18 or 20 pointing to that command buffer 14 processes it, rendering a chunk 12. Local memory 60 (FIG. 1) stores the rendered chunk 12 in a batch buffer 36. In action 44, that rendering device's pointer 29 or 31 moves to point to the next command buffer 14. At this stage, the instructions 32 repeat, beginning with instruction 40.

If the slave pointer 31 does not point to a command buffer 14 below the master pointer 29, then only one, final command buffer 14 remains in the ring buffer 26. Instruction 46 asks which device 18 or 20 triggered this set of instructions 32 (i.e. which pointer 29 or 31 just pointed to the final command buffer 14). If it was the master 18, the master 18 waits in action 48 for the slave 20 to finish rendering the final chunk in action 74 and trigger instruction 76. Otherwise, the slave 20 processes the final command buffer 14 in action 74, rendering the final chunk.

Once the slave 20 finishes rendering the final chunk in action 74, one of the devices 18 or 20 stops functioning while the other assembles the final, rendered image in local memory 60, from the batch buffers 36 stored there, where the final image can be accessed by the RAMDAC 68 and displayed on the monitor. Instruction 76 asks which device 18 or 20 should assemble the final image in local memory 60. The driver software determines which device 18 or 20 should assemble the final image given the specific device configuration. If the software chooses the master 18, the master 18 in action 78 assembles the final image from all of the rendered chunks and the slave 20 terminates. After assembling the final image, the master 18 terminates in action 80. If the software chooses the slave 20, the same events occur, with the devices 18 and 20 reversed, in actions 82 and 84. Thus, having rendered a complete image, devices 18 and 20 are terminated until called to render another image.

Other embodiments are within the scope of the following claims.

What is claimed is:

1. A method of rendering an image, the method comprising:
   dividing the image into regions;
   rendering the regions in one of at least a first rendering device and a second rendering device, where one of the first rendering device or second rendering device has better image rendering performance than the other; and
   determining which one of the at least first and second rendering devices renders each one of at least some of the regions based on the progress of the first rendering device in rendering of other regions, in which the regions are rendered by the first of the at least two rendering devices working from a first end of a data storage device towards a center of the data storage device and the second of the two rendering devices working from a second end of the data storage device towards the center, in which the data storage device contains commands to render the regions, and when both of the rendering devices render adjacent regions within the data storage device all commands have been completed.

2. The method of claim 1 in which the regions are identically-sized rectangles.

3. The method of claim 1 in which one rendering device of the at least two rendering devices acts as a master in controlling which rendering device of the at least two rendering devices renders each region.

4. An article comprising a computer-readable medium which stores computer-executable instructions for rendering an image, the instructions causing a computer to conduct operations comprising:
   divide an image into regions;
   render the regions in one of at least first and second rendering devices where the first rendering device has better image rendering performance than the second rendering device; and
   determine which one of the at least first and second rendering devices renders each one of at least some of the regions based on the progress of only one of the first and second rendering devices in the rendering of other regions, in which the regions are rendered by the first of the rendering devices working from a first end of a data storage device towards a center of the data storage device and the second of the rendering devices working from a second end of the data storage device towards the center, in which the data storage device contains commands to render the regions and when both of the rendering devices render adjacent regions within the data storage device, all commands have been completed.

5. The article of claim 4 in which the regions are identically-sized rectangles.

6. The article of claim 4 in which one rendering device of the at least two rendering devices acts as a master in determining which rendering device of the at least two rendering devices renders each region.

7. A method of rendering an image, the method comprising:
- dividing an image into regions;
- creating a command buffer for each of the regions, each command buffer containing instructions to render the region;
- placing each command buffer in a data storage device; and
- processing each of the command buffers with one of at least first and second rendering devices where the first rendering device has better image rendering performance than the second rendering device, the first rendering device processing at least one of the command buffers starting at a first end of the data storage device and the second rendering device processing at least one of the command buffers starting at a second end of the data storage device.

8. The method of claim 7 in which the command buffers are placed in the data storage device according to an optimization criteria.

9. The method of claim 7 in which the optimization criteria orders each of the command buffers in the data storage device at least partially based on a complexity of instructions in each of the command buffers.

10. The method of claim 7 in which the optimization criteria orders each of the command buffers in the data storage device at least partially based on which rendering device is more likely to render each of the command buffers.

11. The method of claim 7 in which the regions are identically-sized rectangles.

12. An article comprising a computer-readable medium which stores computer-executable instructions for rendering an image, the instructions causing a computer to conduct operations comprising:
- divide an image into regions;
- create a command buffer for each of the regions, each command buffer containing instructions to render the region;
- place the command buffers in a data storage device; and
- process the command buffers with first and second rendering devices, the first rendering device processing at least one of the command buffers starting at a first end of the data storage device and the second rendering device processing at least one of the command buffers starting at a second end of the data storage device, both working toward a middle portion of the data storage device, at which middle portion all command buffers will have been executed.

13. The article of claim 12 in which the command buffers are placed in the data storage device according to an optimization criteria.

14. The article of claim 13 in which the optimization criteria orders each of the command buffers in the data storage device at least partially based on the complexity of the instructions in each of the command buffers.

15. The article of claim 13 in which the optimization criteria orders each of the command buffers in the data storage device at least partially based on which rendering device is more likely to render each of the command buffers.

16. The article of claim 12 in which the regions are identically-sized rectangles.

17. An apparatus for rendering an image, the apparatus comprising:
- a processor configured to divide the image into regions and to create a command buffer for each one of the regions, each command buffer containing instructions to render one region, and to place the command buffers in a data storage device; and
- at least two rendering devices configured to render the regions, a first rendering device processing at least one of the command buffers starting at a first end of the data storage device and a second rendering device processing at least one of the command buffers starting at a second end of the data storage device, both working toward a middle portion, at which point all command buffers will have been executed.

18. The apparatus of claim 17 in which the command buffers are placed in the data storage device according to an optimization criteria.

19. The apparatus of claim 18 in which the optimization criteria orders each of the command buffers in the data storage device at least partially based on the complexity of the instructions in each of the command buffers.

20. The apparatus of claim 18 in which the optimization criteria orders each of the command buffers in the data storage device at least partially based on which rendering device is more likely to render each of the command buffers.

21. The apparatus of claim 17 in which the regions are identically-sized rectangles.

22. A method comprising:
- dividing an image into a plurality of subportions;
- estimating an amount of time required to render each of the subportions;
- prioritizing the subportions based on their respective estimated amounts of time to generate an ordered list having first and second ends;
- rendering the sub-portions at the first end of the ordered list using a first rendering rendering device; and
- rendering the sub-portions at the second end of the ordered list using a second rendering rendering device having an image sub-portion rendering rate different than an image sub-portion rendering rate of the first rendering device.

* * * * *